United States Patent [19]
Krude

[11] Patent Number: 4,915,673
[45] Date of Patent: Apr. 10, 1990

[54] VARIABLE DIAMETER PULLEY HAVING EXTENDIBLE ELEMENTS

[75] Inventor: Werner Krude, Oxford, Mich.

[73] Assignee: GKN Automotive, Inc., Auburn Hills, Mich.

[21] Appl. No.: 365,555

[22] Filed: Jun. 13, 1989

[51] Int. Cl.[4] .................. F16H 7/06; F16H 55/52
[52] U.S. Cl. .................. 474/49; 474/155; 474/206
[58] Field of Search .............. 474/49, 50, 52, 54, 474/56, 57, 206, 152, 153, 155; 59/5, 84, 85

[56] References Cited

U.S. PATENT DOCUMENTS

| | | | |
|---|---|---|---|
| 2,585,634 | 2/1952 | Deletaille | 474/54 |
| 3,956,944 | 5/1976 | Tompkins | 474/54 X |
| 4,530,676 | 7/1985 | Leonard | 474/49 |
| 4,591,351 | 5/1986 | Kumm | 474/49 |

*Primary Examiner*—Thuy M. Bui
*Attorney, Agent, or Firm*—Remy J. VanOphem

[57] ABSTRACT

A variable diameter pulley having a plurality of belt support members arranged in a circular pattern between a pair of side members. Each side member consists of a pair of adjacent disk members rotatable relative to each other. The disk members have crossing guideways which control the radial position of the belt support members as a function of the rotational orientation between them. Extendible elements are disposed between adjacent belt support members to provide the variable diameter pulley with a generally cylindrical belt engagement surface.

20 Claims, 2 Drawing Sheets

VARIABLE DIAMETER PULLEY HAVING EXTENDIBLE ELEMENTS

BACKGROUND OF THE INVENTION

1. Field of the Invention

The invention is related to the field of variable diameter pulleys and in particular to a variable diameter pulley having a plurality of discrete belt supporting members arranged in a circular pattern.

2. Description of the Prior Art

Variable diameter pulleys of the type taught by Kumm in U.S. Pat. Nos. 4,295,836, 4,591,351, and 4,768,966, have a plurality of belt supporting members arranged in a circular pattern about an axis of rotation. The diameter of this circular pattern is the effective diameter of the variable diameter pulley and is variable as a function of the rotational orientation between two (2) pairs of juxtaposed disk members which support the ends of the belt support members. The belt support members are equally spaced about the circumference of a circular pattern and only make line contact with a drive belt at spatially separated locations. As a result, the surface engaged by the drive belt is effectively the same as a multi-faced wheel having a plurality of flat belt engaging surfaces with relatively sharp corners. FIG. 1 is an exaggerated example inn which the circular pattern 10 is formed by six (6) equally spaced belt supporting members 12 which effectively occupy the corner positions of a multi-faced geometrical FIG. 14 which, in FIG. 1, is a hexagon. A drive belt 16 engaging this hexagonally-shaped surface will experience relatively sharp bends at the individual belt engaging members which are greater than the curvature of the circular pattern 10 defined by the six belt supporting members 12. This will cause excessive stress on the drive belt reducing its life expectancy. The effective multi-faced pattern resulting from the spatially separated belt supporting members will also result in excessive noise being generated at the drive belt/pulley interface.

The invention is directed to extendible elements which span the spaces between the individual belt supporting members and present to the drive belt 16 a belt engaging surface which eliminates the sharp corners and makes the belt engaging surfaces of the variable diameter pulley more closely approximate a cylindrical surface.

SUMMARY OF THE INVENTION

The invention is an improvement to a variable diameter pulley having a pair of spatially separated side members, a plurality of belt support members supported between the spatially separated side members in a circular pattern, and means for radially displacing the belt support members between maximum and minimum radial positions. The improvement is a plurality of extendible elements connected between adjacent belt supporting members. At least two of the extendible elements are pivotably connected to each of the belt support members and slidably connected to at least one adjacent belt support member. Each of the extendible elements have a convex external surface providing a generally cylindrical surface for engagement by a drive belt.

The object of the invention is a variable diameter pulley which eliminates the sharp bends at the drive belt/pulley interface to reduce fatigue and excessive stress on the drive belt.

Another object of the invention is a variable diameter pulley having a plurality of extendible elements connected between adjacent belt supporting members to provide a curved surface therebetween.

Still another object of the invention is a variable diameter pulley having a plurality of extendible elements connected between adjacent belt support members to provide a generally cylindrical surface for engagement by a drive belt.

Another object of the invention is a variable diameter pulley having a plurality of extendible elements disposed between adjacent belt support members having a segmented external contour which presents to the drive belt a generally cylindrical surface when the belt support members are in their maximum and minimum radial positions. These and other objects of the invention will become more apparent from a reading of the specification in connection with the appended drawings.

DETAILED DESCRIPTION OF THE PREFERRED EMBODIMENT

In the variable diameter pulley taught by Kumm in U.S. Pat. No. 4,295,836, a plurality of belt supporting members are supported between a pair of spatially separate side members in a circular pattern. Each side member consists of a pair of adjacent disk members, each of which has a plurality of guideway slots. The guideway slots in the adjacent disk members extend radially along paths which curve in opposite directions so that each guideway slot in one disk member crosses a guideway slot in the adjacent disk member. As a result, the guideway slots form a plurality of through apertures in a circular pattern.

The ends of the belt supporting members are supported in these through apertures and form a segmented drive belt engaging surface. Because the guideway slots are curved in opposite directions, a rotation of one of the disk members relative to its adjacent disk member will cause the radial location at which the guideway slots cross each other to be radially displaced and, therefore, causes the location of the belt supporting members to be radially displaced changing the effective diameter of the variable diameter pulley.

Figure 1:
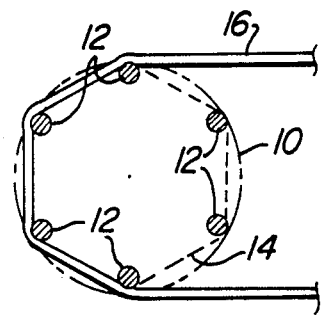
FIG. 1 is a cross-sectional side view of the path of a drive belt around a prior art variable diameter pulley.
Figure 2:
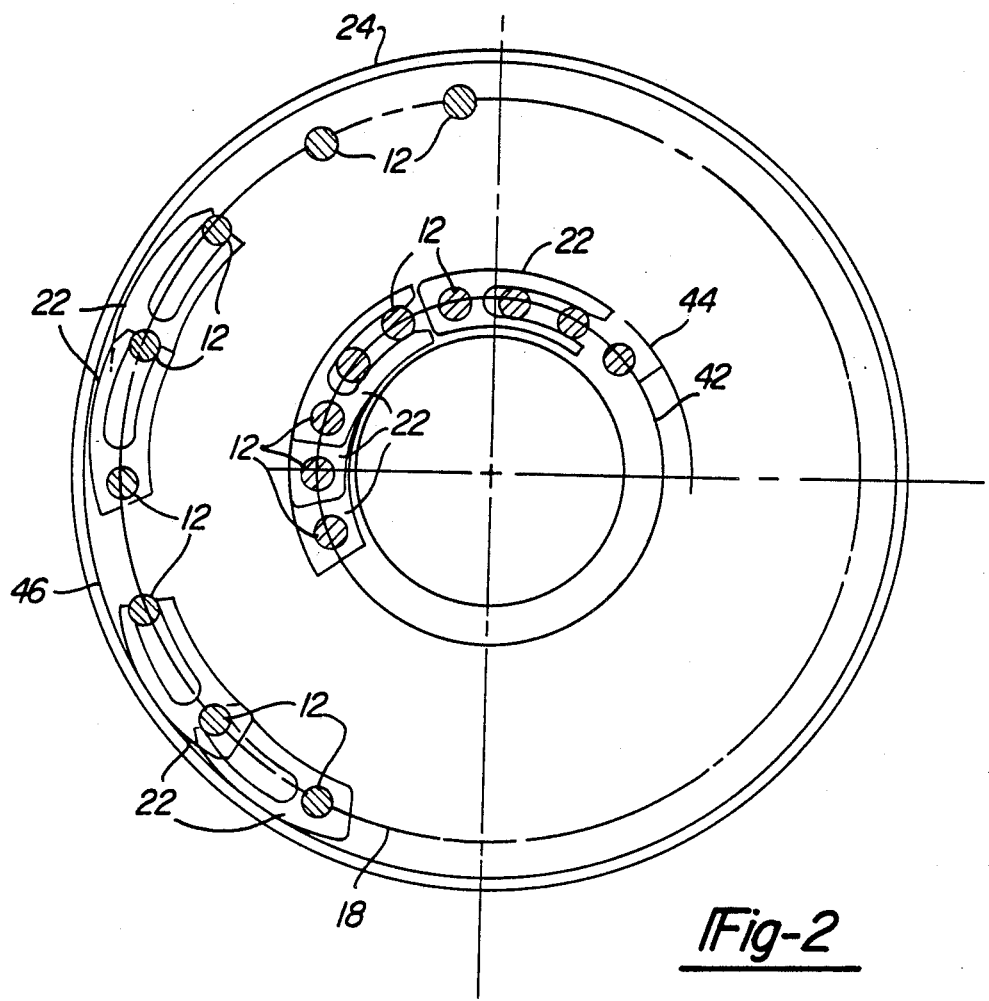
FIG. 2 is a cross-sectional side view of a variable diameter pulley having a plurality of extendible elements connected between adjacent belt support members viewed in the direction of lines 2—2 of FIG. 3.
Figure 3:
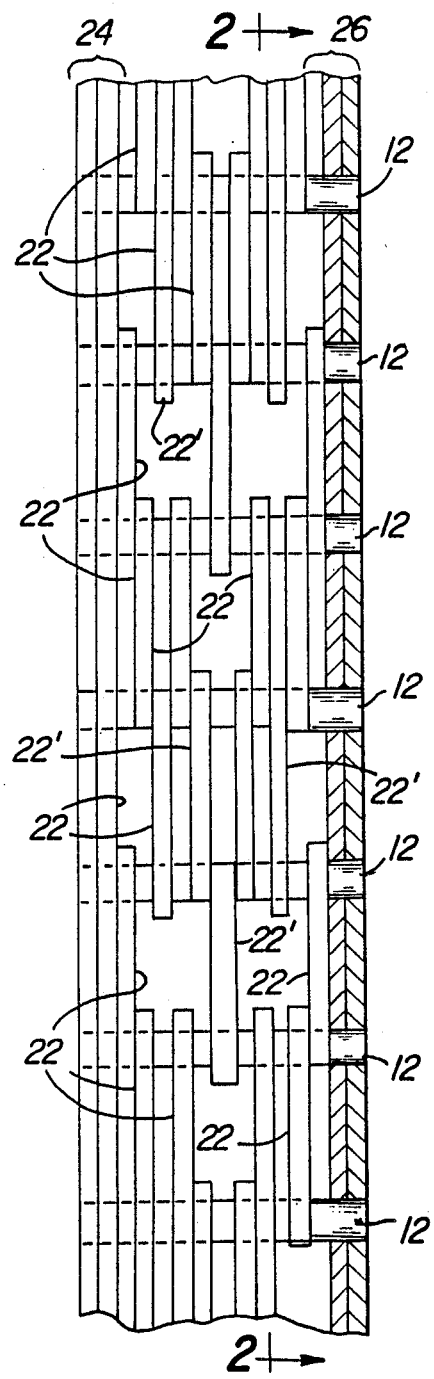
FIG. 3 is an unrolled end view of the variable diameter pulley showing the arrangement of the extendible elements between the side members when the belt support members are in their maximum radial position.

Referring now to FIG. 2, there is shown a cross-sectional side view of a variable diameter pulley taken along section lines 2—2 of FIG. 3 in which a plurality of belt support members 12 are shown at their outermost and their innermost radial positions. The belt support members 12 are comparable to the belt support members 12 taught by Kumm in U.S. Pat. No. 4,295,836, but do not directly engage the drive belt 16 in contrast to the teachings of Kumm. Because the belt support members 12 shown in FIG. 2 are comparable to the belt support members 12 taught by Kumm and illustrated in FIG. 1, the same reference numeral will be used to identify the belt support members in FIG. 2 and subsequent figures. The guideway slots in the pair of adjacent disk members which constitute each side member are omitted in FIG. 2 since their location and shape are not material to the invention.

When the belt support members 12 are in their outermost radial positions, indicated by the belt support members lying along circle 18, a plurality of extendible elements 22 are connected between adjacent belt support members 12 spanning the gap therebetween. The extendible elements are arranged in a plurality of rows which extend completely around the circle 18. In the embodiment shown in FIG. 3, there are eleven rows of extendible elements 22 filling the space between side members 24 and 26. The numbers of rows of extendible elements 22 is dependent upon the spacing between the side members 24 and 26 and the thickness of the individual extendible elements 22.

As shown in FIG. 3, the extendible elements 22 are preferably arranged in a single repetitive pattern between the side members 24 and 26. In this preferred arrangement, some of the extendible elements 22 such as those indicated by reference numeral 22' extend in a direction opposite the extendible elements designated by the reference numeral 22. It is also preferred that the portion of the pattern on the left half is a mirror image of the portion of the pattern on the right half so that there is no tendency for the pattern of the extendible elements to produce a lateral force on the drive belt to cause it to be shifted towards one side member or the other. Those skilled in the art will recognize that there are many other patterns for the lateral placement of the extendible elements 22 along the belt support members 12 which would be just as effective as the pattern shown in FIG. 3.

Figure 4:
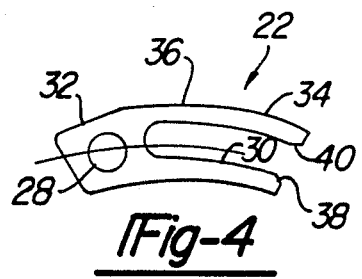
FIG. 4 is a side view showing the details of the extendible elements.

The details of the extendible elements are shown in FIG. 4. The extendible elements have a generally arcuate shape with a convex upper surface and a concave lower surface. Each extendible element 22 has a pivot bore 28 provided at one end and an arcuate slot 30 provided at the opposite end. The belt support members are threaded through the pivot bores 28 of the extendible elements to pivotably secure the extendible elements 22 to the belt support members 12. The arcuate slot 30 is open at the end opposite the pivot bore 28. The radius of curvature of the arcuate slot 30 is substantially the same as the radius of the circular pattern 42 of the belt support members 12 when they are displaced to their minimum radial positions as shown in FIG. 2. The open ends of the arcuate slots 30 permit the arcuate slots to receive at least a second belt support member when the belt support members 12 are in their minimum radial positions. Bevels 38 and 40 are provided at the open end of the arcuate slot 30 to facilitate the entrance of a second belt support member 12 into the arcuate slot 30 as the diameter of the circle formed by the belt support members 12 decreases to its minimum value.

The external convex surface of the extendible element 22 has a segmented contour. Two end segments 32 and 34 thereof have a radius of curvature which corresponds to the radius of a circle 44 tangent to the surface formed by the extendible elements 22 when the belt support members 12 are in the fully retracted or minimum radial positions. A central segment 36 of the external surface has a radius of curvature which corresponds to the radius of a circle 46 tangent to the surface formed by the extendible elements 22 when the belt support members 12 are in their fully extended or maximum radial positions.

As can be seen, the extendible elements 22 form a generally cylindrical drive belt engagement surface and eliminate the excessive drive belt fatigue caused by the sharp bends encountered by the embodiments taught by the prior art where the drive belt 16 directly engages the belt support members 12. The extendible elements also significantly reduce the noise generated at the drive belt/pulley interface.

Figure 5:
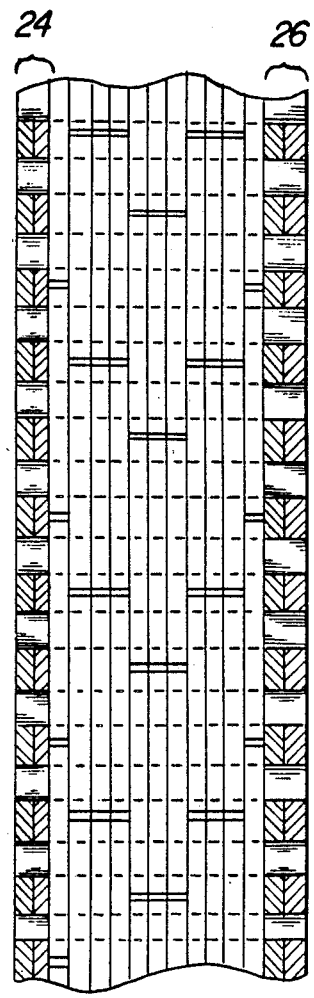
FIG. 5 is an unrolled end view of the variable diameter pulley showing the position of the extendible elements when the belt supporting members are in their minimum radial positions.

FIG. 5 shows the locations of the extendible elements 22 when the belt support members 12 are in their minimum radial positions.

To simplify the drawings to show the lateral arrangement of the extendible elements 22 along the belt support members 12 shown in FIGS. 3 and 5, the extendible elements 22 are shown in an unrolled planar format. In this unrolled format, the cylindrical surface formed by the extendible elements is flattened out to more clearly show the spacing and relationship between the individual extendible elements.

It is recognized that those skilled in the art may be able to conceive other configurations of the extendible elements which are different from those shown in the drawings and discussed in the specification without departing from the spirit of the invention as disclosed herein and set forth in the appended claims.

What is claimed is:

1. A variable diameter pulley having a pair of spatially separated side members, a plurality of belt support members supported between said spatially separated side members in a circular pattern, and means for radially displacing said belt support members between a maximum and a minimum radial position, an improvement comprising:
a plurality of extendible elements, at least two of said extendible elements of said plurality of extendible elements being pivotably connected to each of said belt support members and slidably connected to at least one adjacent belt support member, each said extendible element of said plurality of extendible elements having a convex external surface providing a generally cylindrical surface for engagement by a drive belt.

2. The improvement of claim 1, wherein each extendible element of said plurality of extendible elements has an aperture provided at one end pivotably receiving therethrough an associated one of said belt support members and an arcuate slot provided at the other end for slidably receiving an adjacent belt suppot member.

3. The improvement of claim 2, wherein said arcuate slot has an open end at the end of said extendible element opposite said one end to enable a second belt support member to be received in said arcuate slot when said belt support members are in their minimum radial positions.

4. The improvement of claim 3, wherein said open end of said arcuate slot is beveled to guide said second belt support member into said arcuate slot.

5. The improvement of claim 1, wherein said convex external surface is segmented into at least two segments, each of said at least two segments having a different radius of curvature.

6. The improvement of claim 1, wherein said convex external surface is segmented into a first segment, an intermediate segment and a third segment, wherein the radius of curvature of said first and third segments are the same and the radius of curvature of said intermediate segment is larger than the radius of curvature of said first and third segments.

7. The improvement of claim 1, wherein said plurality of extendible elements form a plurality of rows between said pair of spatially separated side members arranged in a predetermined pattern.

8. The improvement of claim 7, wherein said predetermined pattern is symmetrical about a centerline midway between said pair of spatially separated side members.

9. The improvement of claim 8, wherein all of said extendible members in preselected rows of said plurality of rows extend to said adjacent belt support members in a clockwise direction from their associated belt support member and wherein all of said extendible members in the remaining rows of said plurality of rows extend to said adjacent belt support member in a counterclockwise direction about said circular pattern formed by said plurality of belt support members.

10. An extendible member for forming an arcuate surface between the belt support members of a variable diameter pulley comprising:
  a kidney-shaped plate having a pair of generally parallel flat surfaces, a convex outer edge and a concave inner edge;
  a pivot bore provided through said plate at one end thereof for pivotably receiving one of said belt support members, the axis of said pivot bore being normal to said pair of generally parallel flat surfaces; and
  an arcuate slot provided through said pair of generally parallel flat surfaces of said plate at the other end of said plate for slidably receiving an adjacent belt support member.

11. A variable diameter pulley engageable by a drive belt, comprising:
  a pair of spatially separated side members having a common axis of rotation;
  a plurality of belt support members supported between said spatially separated side members in a circular pattern;
  means for radially displacing said belt support members between a maximum radial position and a minimum radial position to vary the diameter of said circular pattern;
  a plurality of extendible elements, at least one of said plurality of extendible elements pivotably connected to each of said belt support members and slidably connected to at least one adjacent belt support member, each of said extendible elements of said plurality of extendible elements having a convex external surface providing a generally cylindrical surface for engagement by a drive belt.

12. The variable diameter pulley of claim 11, wherein each belt support member of said plurality of belt support members has a cylindrical cross-section, each of said extendible elements of said plurality of extendible elements has an aperture provided adjacent to one end pivotably receiving therethrough one of said belt support members of said plurality of belt support members and an arcuate slot provided at the other end slidably receiving at least one adjacent belt support member.

13. The variable diameter pulley of claim 12, wherein said arcuate slot has an open end at the end of said extendible member opposite said one end to enable a second belt support member to be received in said arcuate slot when said plurality of belt support members are displaced to their minimum radial positions.

14. The variable diameter pulley assembly of claim 13, wherein said open end of said arcuate slot is beveled to guide said second belt support member into said arcuate slot.

15. The variable diameter pulley of claim 11, wherein said convex external surface is segmented into at least two segments, each of said at least two segments having a different radius of curvature.

16. The variable diameter of claim 11, wherein said convex external surface is segmented into a first segment, an intermediate segment and a third segment, each having a radius of curvature different from its adjacent segment.

17. The variable diameter pulley of claim 16, wherein said radius of curvature of said first and third segments is equal to the radius of a circle formed by said plurality of extendible elements when said plurality of belt support members are at their minimum radial positions and the radius of curvature of said intermediate segment is equal to the radius of a circle formed by said plurality of extendible elements when said belt support members are at said maximum radial positions.

18. The variable diameter pulley of claim 11, wherein each belt support member has at least two extendible elements pivotably connected thereto and at least two different extendible elements slidably connected thereto in a predetermined pattern.

19. The variable diameter pulley of claim 18, wherein said predetermined pattern is symmetrical about a centerline midway between said pair of spatially separated side members.

20. The pulley assembly of claim 18, wherein a first portion of said extendible elements of said plurality of extendible elements extend from said belt support member to which they are pivotably connected to an adjacent belt support member in a clockwise direction and the remaining portion of said extendible elements of said plurality of extendible elements extend from said belt support member to which they are pivotably connected to an adjacent belt support member in a counterclockwise direction.

* * * * *

UNITED STATES PATENT AND TRADEMARK OFFICE
CERTIFICATE OF CORRECTION

PATENT NO. : 4,915,673
DATED : April 10, 1990
INVENTOR(S) : Werner Krude

It is certified that error appears in the above-identified patent and that said Letters Patent is hereby corrected as shown below:

Column 1, line 25, delete "inn" and insert ---- in ----.

Column 4, line 56, delete "suppot" and insert ---- support ----.

Column 6, line 18, delete "assembly".

Column 6, line 26, after "diameter" insert ---- pulley ----.

Column 6, line 49, after "The" insert ---- variable diameter ----.

Signed and Sealed this

Fifth Day of May, 1992

Attest:

DOUGLAS B. COMER

Attesting Officer     Acting Commissioner of Patents and Trademarks